United States Patent [19]
Grosseau

[11] 3,832,010
[45] Aug. 27, 1974

[54] BRAKE CONTROL DEVICES FOR PREVENTING LOCKING A BRAKED WHEEL

[75] Inventor: Albert Grosseau, Chaville, France

[73] Assignee: S.A. Automobiles Citroen, Paris, France

[22] Filed: June 6, 1972

[21] Appl. No.: 260,318

[30] Foreign Application Priority Data
Dec. 13, 1971 France .......................... 71.45188

[52] U.S. Cl...... 303/21 EB, 188/181 C, 303/21 CF, 303/61
[51] Int. Cl............................................. B60t 8/10
[58] Field of Search .......... 188/181; 303/20, 21, 61; 317/5; 324/161, 162; 340/262, 263

[56] References Cited
UNITED STATES PATENTS

| | | | |
|---|---|---|---|
| 3,245,213 | 4/1966 | Thompson et al. ............. | 303/21 EB |
| 3,260,555 | 7/1966 | Packer .......................... | 303/21 EB |
| 3,398,995 | 8/1968 | Martin .......................... | 303/21 BE |
| 3,494,671 | 2/1970 | Slavin et al. ................... | 303/21 P |
| 3,499,689 | 3/1970 | Carp et al. ..................... | 303/21 P |
| 3,503,653 | 3/1970 | Davis et al. .................... | 303/21 CE |
| 3,558,197 | 1/1971 | Lueck et al. .................... | 303/21 BE |
| 3,576,350 | 4/1971 | Larsen ........................... | 303/21 F |
| 3,583,773 | 6/1971 | Steinbrenner .................. | 303/21 EB |
| 3,656,816 | 4/1972 | Schlitz et al. ................... | 303/21 P |
| 3,682,513 | 8/1972 | Oberthur ........................ | 303/21 F |
| 3,698,772 | 10/1972 | Nixon ............................ | 303/21 BE |
| 3,703,946 | 11/1972 | Ondrasik ........................ | 303/21 F X |

Primary Examiner—Trygve M. Blix
Assistant Examiner—Stephen G. Kunin
Attorney, Agent, or Firm—Eyre, Mann & Lucas

[57] ABSTRACT

A brake control device for the wheel of a motor or other vehicle comprises an electrically operated valve incorporated in the braking circuit of the wheel. The valve is controlled by a pulsed current having a frequency or width dependent on the degree of slip of the wheel, and serves to limit the pressure of fluid in the braking circuit during such wheel slip.

16 Claims, 4 Drawing Figures

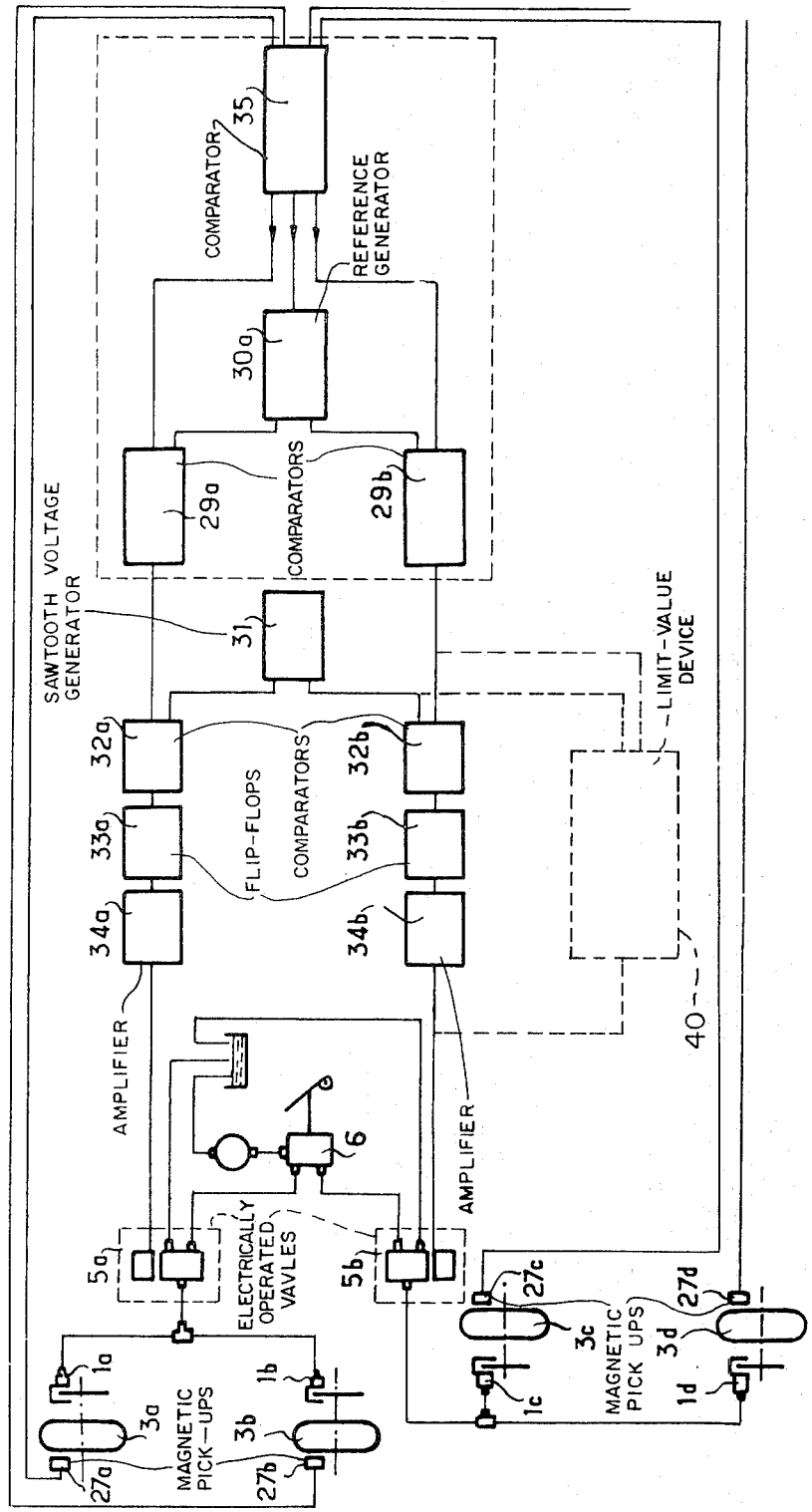

BRAKE CONTROL DEVICES FOR PREVENTING LOCKING A BRAKED WHEEL

BACKGROUND OF THE INVENTION

1. Field of the Invention

The present invention relates to a device for controlling the braking of at least one wheel of a vehicle travelling along the ground, such as an aeroplane or a motor vehicle, and its purpose is to provide a device of that type with which optimum deceleration can be achieved in all conditions of adhesion, while avoiding the wheel-lock that is apt to occur when braking is too fiercely applied.

2. Description of the Prior Art

In the field of motor vehicles, previously proposed wheel-lock preventing devices generally comprises means by which the pressure of the fluid supplied to the brakes is reduced as soon as deceleration and/or the slip of the braked wheels passes particular threshold values. In that way, wheel-lock is avoided, but optimum deceleration of the vehicle and hence optimum braking distance can be achieved only at the cost of complicated regulation to enable the brake pressure to be reapplied as the wheel that was seeking to lock is reaccelerated.

It is thus difficult to avoid jerky action, which adversely affects comfort as well as the working-life of the mechanical components such as transmission members, especially when the brake components have been mounted on means other than the wheel, so as to limit the un-sprung weight of the wheels.

The use of an electrically operated valve of the "proportioning" type, that is to say a valve delivering a pressure substantially proportional to a control signal, enables these drawbacks to be overcome, the signal applied to it being governed by the slip of the braked wheel, so that the slip is kept at optimum level irrespective of adhesion.

In this case, for reliable operation, there must be great precision in the correlation between the braking pressure and the control signal, with minimum inertia.

An object of the present invention is a braking control device which fulfills that purpose.

SUMMARY OF THE INVENTION

The braking control device in accordance with the invention comprises means for generating an electric signal governed by the slip of the braked wheel, and an electrically operated valve of "proportioning" type, which is inserted in the brake circuit of that wheel and has its winding connected to the signal generator, so as to limit, in proportion to the signal and hence to the degree of slip, the maximum pressure it is possible to apply to the wheel braking, the device having means for supplying a pulsed current governed by slip, connected to the valve winding.

The pulsed current can be made up of pulses of fixed frequency but varying in width according to the degree of slip, or of fixed width but varying in frequency according to the degree of slip.

The electrically operated valve should preferably be of the slide type and should incorporate means, controlled by the pressure "downstream", for moving the slide towards its closed position, as well as an opposing spring that seeks to move the slide towards its open position, the direction of winding of the valve and its connections being such that the pulsed current seeks to move the slide in the direction opposite to that in which the spring acts.

By this arrangement, the braking power assumes a value such that the wheel slip is kept as close as possible to its optimum value, practically without inertia and without any risk of locking.

Although it is theoretically necessary, in determining the degree of wheel slip, to know the speed of travel of the vehicle, the device can incorporate, for determining the slip of the wheel that is to be braked, means for comparing the speed of that wheel with the speed of the fastest wheel of the vehicle; it is unlikely, even with braking on all wheels, that all the wheels will lock simultaneously.

For safety, however, means can be provided for putting data of the speed of the fastest wheel into a memory store and supplying a signal decreasing in value at a speed representing the maximum deceleration obtainable in optimum conditions of adhesion.

In certain cases, especially that of a motor vehicle that is lightly loaded at the rear in relation to the load at the front, such as a front-wheel-drive vehicle, there is advantage in using the device for controlling the braking on the front wheels only and to combine it with a rear-wheel braking control device incorporating a "hit or miss" electrically operated valve inserted in the rear-wheel brake circuit. This valve can be controlled by a conventional threshold-deceleration or threshold-slip device. Such an arrangement provides an effective method of avoiding rearwheel lock while making best use of the adhesion available on the front wheels.

The device can be combined with a dual braking circuit, with one circuit for the front axle and one for the rear axle, means being provided for placing a limit, according to the static and dynamic loading of the rear axle, on the maximum possible pressure of fluid serving the braking of the wheels on that axle, so as to obtain uniform ground adhesion and prevent the rear wheels from locking before the front wheels.

BRIEF DESCRIPTION OF THE DRAWINGS

Embodiments of the invention will now be described, by way of example only, with reference to the accompanying diagrammatic drawings, in which:

FIG. 4 is a diagram of a device for controlling the braking on all four wheels of a vehicle.

DESCRIPTION OF THE PREFERRED EMBODIMENTS

Figure 1:
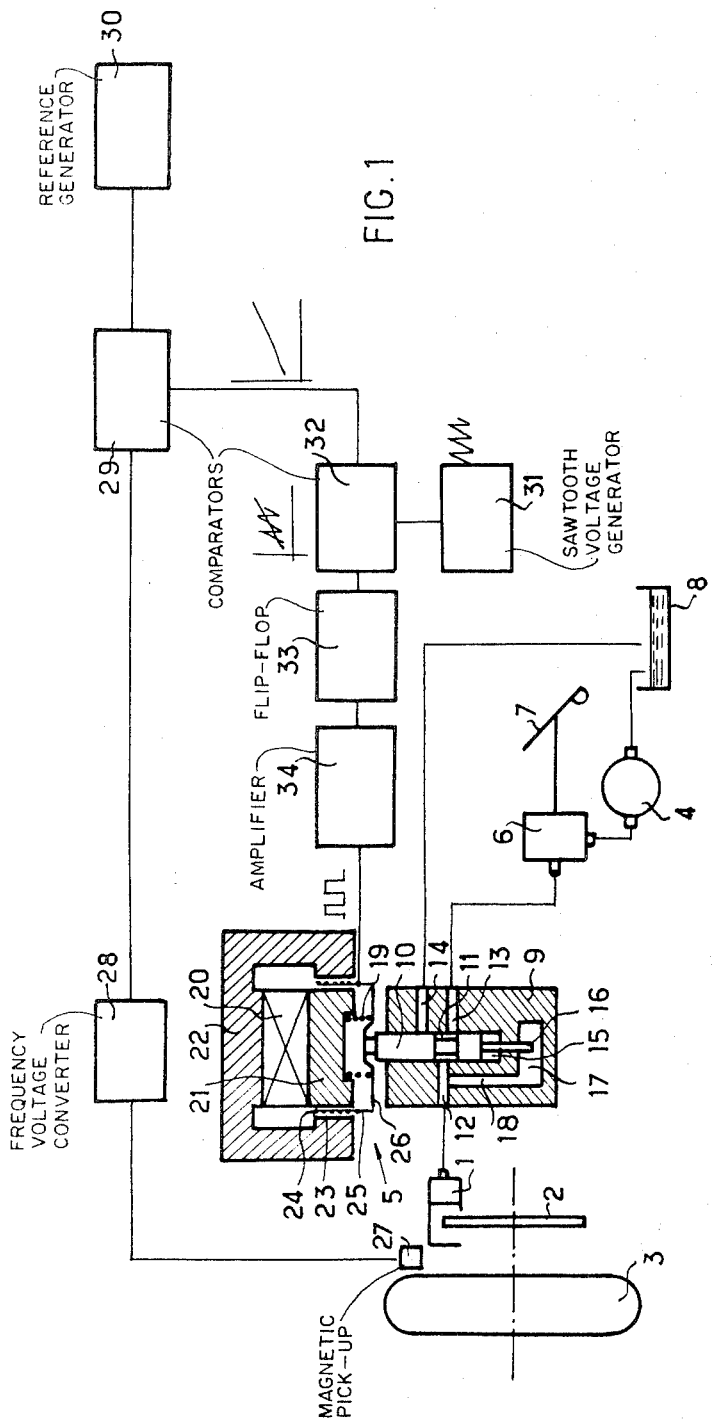
FIG. 1 is a circuit diagram of a device for controlling the braking of one wheel or a vehicle.

As shown in FIG. 1 a brake cylinder 1 operates in conjunction with a disc 2 rigidly attached to a vehicle wheel 3 which is to be braked.

The cylinder 1 can be placed in communication with a pressure source 4 by an electrically operated valve 5, and by a feed-control valve 6 operated by a brake pedal 7. A tank 8 is connected to the pressure source intake.

The valve 5 has a distributor comprising a body 9 containing a bore within which a slide 10 is fitted with freedom to slide. The slide 10 contains an annular groove 11 by means of which a passage 12, connected to the cylinder 1, can be placed in communication either with a passage 13, connected to the feed-control valve 6, or with a passage 14 connected to the tank 8. When the slide 10 is moved upwardly from the position shown in the Figure, the passage 12 is gradually brought into communication with the passage 14, while communication between the passage 12 and the passage 13 is gradually cut; the result is a drop in pressure within the brake cylinder 1.

One end of the bore in the body 9 constitutes a chamber 15 which receives one end portion of a pin 16 in contact with the slide 10. The other end portion of the pin 16 lies in a chamber 17 connected with the passage 12 by a duct 18.

A spring 19 exerts an axial force (F) on that end of the slide 10 which is remote from the chamber 15. The slide 10 is thus subjected to two opposing forces, namely the force F, and the force exerted on the pin 16 by the pressure ($P_u$) prevailing in the chamber 17, that is to say the pressure in the brake cylinder 1.

The valve 5 also incorporates an electrodynamic motor comprising a permanent magnet 20 mounted between a pole piece 21, and a pot-shaped magnetic yoke 22, which together with the pole piece 21, defines an annular air gap 23. The spring 19 bears against the pole piece 21. A winding 24, supported by a core 25 is located within the gap 23. The core 25 is fitted over a cup 26, the bottom of which is held against the slide 10 by the spring 19.

The spring 19 is arranged to hold the slide 10, when no current is flowing in the winding 24, in the position shown in the Figure, in which the lower edge of the groove 11 is level with the passage 13, so that the slightest upwards movement of the slide 10 will reduce the cross-sectional area of the outlet of the passage 13. The spring 19 exerts on the slide 10, when it is in this position, a force F having a value of P.s, in which s is the cross-sectional area of the pin 16 and P is the pressure of braking fluid in the passage 13. When current flows in the winding 24 in the appropriate direction, the winding 24 seeks to move upwardly to exert a force ($f$) on the cup 26 proportional to the mean strength $I_m$ of the current flowing through the winding. Slide 10 follows the displacement of the winding as a result of the force exerted on the slide by the pressure prevailing in chamber 17. The pressure $P_u$ in the brake cylinder thus assumes a value of:

$P^u = P - \Delta P$, given by the formula
$F - f = (P - \Delta P)s$, which shows that the braking pressure reduction P is proportional to $f$, that is to say to the mean strength $I_m$ of the current flowing through the winding 24.

Fitted adjacent to the wheel 3 is a magnetic pick-up 27, which emits pulses having a frequency governed by the speed of the wheel. The pick-up 27 can comprise, for example, a magnet equipped with pole pieces having their ends facing a path of equidistant interruptions in a disc of ferro-magnetic material attached rigidly to the wheel, so that the magnetic flux passes through this disc, at least one of the pole pieces being fitted with a coil. The permeance of the magnetic circuit is lower when the ends of the pole pieces lie opposite breaks in the disc than when they lie opposite solid portions of the disc. The pick-up coil is thus traversed by a variable flux and emits a pulsed-signal at a frequency representative of the speed of the disc, i.e., of the wheel 3.

The pick-up 27 is connected to the integration means in the form of a frequency/voltage converter 28 which supplies a current at a voltage governed by the frequency of the input pulses and hence by the speed of the wheel 3.

A comparator 29 is connected to the output of the converter 28 and to a generator 30 which supplies a reference voltage governed by the actual speed of the vehicle and representing a fraction of that speed lying for example between 0.7 and 0.9 of the actual speed; this actual speed can be obtained from an unbraked wheel, if such a wheel exists, or by measurement of the actual deceleration and integration of that deceleration from the braking. The output $U_c$ of the comparator 29 thus represents the difference between the reference speed and the speed of the wheel 3.

A sawtooth voltage generator 31 supplies a voltage having an instantaneous value $U_d$ varying between $U_1$ and $U_2$. A second comparator 32 has one input joined to the sawtooth generator 31, while its other input is joined to the output of the comparator 29. The output of the comparator 32 is joined to the input of a bistable flip-flop 33, the output of which is connected to the winding 24 through an amplifier 34. The flip-flop 33 supplies a voltage $U_s$ when $U_d$ is less than $U_c$, and supplies zero voltage in the contrary case, that is to say when $U_d$ is greater than $U_c$.

Figure 3:
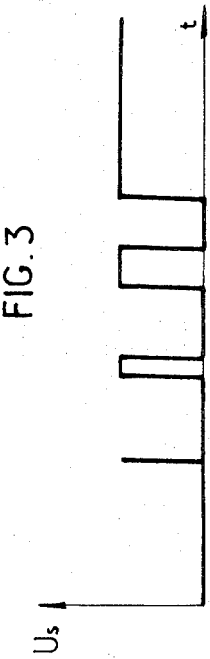
FIG. 3 shows the pulses obtained when the control voltage varies as shown in FIG. 2.
Figure 2:
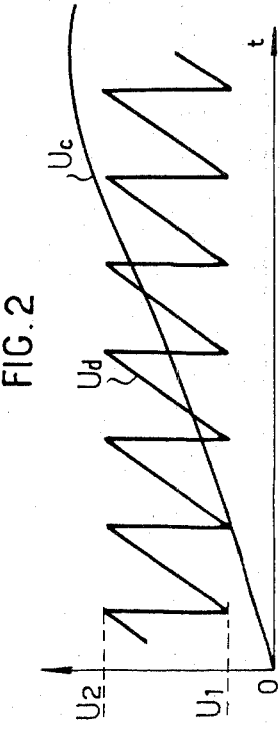
FIG. 2 is a graph showing a control voltage and a sawtooth voltage.

When the voltage $U_c$ is smaller than $U_1$, the voltage at the flip-flop output remains constant at zero. When it is greater than $U_2$, the flip-flop output voltage has a constant value of $U_s$. When the voltage $U_c$ lies between $U_1$ and $U_2$, the voltage $U_d$ is smaller than $U_c$ during an initial portion of the cycle – the greater $U_c$, the longer the said portion; it is greater than $U_c$ during the remaining portion of the cycle (FIG. 2). During the initial portion of the cycle, the difference $U_c - U_d$ is positive and the flip-flop 33 supplies a pulse of voltage $U_s$ (FIG. 3); that pulse ceases when the voltage $U_d$ attains the value $U_c$. It will thus be seen that the pulses emitted by the flip-flop 33 have a fixed frequency, whish is that of the sawtooth generator 31, but vary in width according to the value of the control voltage $U_c$.

The comparator 29 is regulated so as to supply a voltage having a value of $U_1$ when the slip reaches a particular value, such as 0.2, for example.

It will be clear from the foregoing that in the absence of slip or when the slip is less than 0.2, no current flows in the winding 24, the pressure in the cylinder 1 having the value imparted to it by the feed-control valve 6.

When the slip becomes greater than 0.2, a voltage higher than $U_1$ appears at the output of the comparator 29 and the flip-flop 33 supplies pulses having a width commensurate with the amount of slip. These pulses are, in essence, integrated in the winding 24 and the electrically operated valve 5 produces in the brake circuit a pressure drop governed by the slip. There remains, however, some residual modulation, which produces micro-vibrations in the slide 10. These prevent the slide 10 from sticking in the body 9, as might otherwise occur in the event of immobilisation in a given position. Moreover, they create a fictitious overlap between the intake passage 13 and the passage 12, which increases the precision of control.

FIG. 4 shows the application of the device shown in FIG. 1 to all four wheels of the motor vehicle, these wheels being controlled per axle.

The brake cylinders 1a and 1b of the front wheels 3a and 3b are connected to the feed-control valve 6 by a first electrically controlled valve 5a; similarly, the brake cylinders 1c and 1d of the rear wheels 3c and 3d are connected to the feed-control valve 6 by a second electrically operated valve 5b.

Associated with each of the wheels is a pick-up 27a, 27b, 27c or 27d, which is connected to a comparator 35. This comparator determines which wheel has the highest speed and supplies a signal which substantially represents the vehicle speed and is applied to a generator 30a, which multiplies this signal by a value of between 0.7 and 0.9 and supplies a reference speed. The comparator 35 likewise supplies a second signal, which represents the speed of whichever of the front wheels 3a and 3b has the lower speed (i.e., is slipping most on the ground), this signal being applied to a comparator 29a, as well as a signal representing the speed of whichever of the rear wheels 3c and 3d has the lower speed, this signal being applied to a comparator 29b.

The comparator 29a is also connected to the generator 30a and supplies a signal representing the difference between the reference speed and the speed of whichever of the front wheels is turning the more slowly. This signal controls the electrically operated valve 5a through a comparator 32a which is also connected to the sawtooth generator 31, and through a flip-flop 33a, and an amplifier 34a.

Similarly, the comparator 29b is connected to the generator 30a and supplies a signal representing the difference between the reference speed and the speed of whichever of the rear wheels is turning the more slowly. This signal controls the electrically operated valve 5b through a comparator 32b, a flip-flop 33b and an amplifier 34b.

The present invention should naturally not be regarded as limited to the practical examples described and illustrated here. Thus, in particular, the assembly consisting of the comparator 32b, flip-flop 33b and amplifier 34b can be replaced by a limit-value device 40 supplying a continuous voltage to the valve 5b as soon as the slip or deceleration of the rear wheel turning the more slowly exceeds a given value, this voltage being suppressed when the said slip or deceleration goes beyond a threshold value which may be the same as or different from the first.

Again, the pick-up 27 or each of the pick-ups 27a to 27d can be replaced by a tachymetric generator connected to the comparator 29 or 35.

What is claimed is:

1. Apparatus for controlling the braking of at least one wheel of a vehicle traveling along the ground, which comprises:
   a. means operative to provide a pulsed current control signal proportional to the degree of slip of said wheel, said means including
      i. first means operative to generate a first signal proportional to the difference between a reference speed and the speed of said wheel,
      ii. second means operative to generate a sawtooth signal, and
      iii. third means including bistable circuit means operative to receive the sawtooth signal and the first signal and operative to generate the pulsed current control signal in response thereto; and
   b. an electrically operated valve operative to receive the pulsed current control signal and automatically proportion braking pressure responsive thereto.

2. Apparatus as claimed in claim 1, in which the pulsed current control signal comprises pulses of fixed frequency, but of variable width governed by the slip.

3. Apparatus as claimed in claim 1, in which the pulsed current control signal comprises pulses of fixed width but of variable frequency governed by the slip.

4. Apparatus as claimed in claim 1, in which the first means comprises
   means for determining the speed differential between the fastest wheel of the vehicle and the said one wheel.

5. Apparatus as claimed in claim 4, in which the first means further comprises
   means for placing data of the speed of the fastest wheel in a memory store, and
   means for emitting a signal decreasing in value at a speed representing the maximum deceleration obtainable in optimum conditions of adhesion.

6. Apparatus as claimed in claim 4, in which the first means further comprises
   an electro-magnetic pick-up associated with said one wheel emitting pulses at a frequency governed by the wheel speed.

7. Apparatus as claimed in claim 6, in which the first means further comprises
   integration means converting into a variable voltage the pulses of variable frequency coming from the pick-up.

8. Apparatus as claimed in claim 7, in which the first means further comprises
   a first comparator, and
   means generating a voltage representing a fraction of the speed of the fastest wheel, said comparator having inputs connected to the integration means and to the voltage generating means.

9. Apparatus as claimed in claim 8, in which the said third means comprises
   a second comparator receiving the output from the first comparator and from the second means,
   said bistable circuit means comprising a bistable flip-flop controlled by the output signal of the second comparator.

10. Apparatus as claimed in claim 1 wherein the electrically operated valve comprises
    a. an electro-dynamic motor comprising an axially movable winding operative to receive the pulsed current control signal and move responsive thereto; and
    b. slide means connected to the winding operative to move therewith.

11. Apparatus as claimed in claim 10, in which the electrically operated valve further comprises
    means controlled by the downstream fluid pressure tending to move the slide means in a first direction, and
    an opposing spring tending to move the slide means towards an opposite direction.

12. Apparatus as claimed in claim 10 further comprising
    a plurality of wheels a said electrically operated valve associated with each wheel, and a said pulsed current control signal means associated with each wheel governed by the slip of the respective wheel for providing a pulsed current control signal to be applied to the winding of the respective electrically operated valve.

13. Apparatus as claimed in claim 10 wherein said vehicle further comprises front and rear axles with a plurality of wheels on each axle, one electrically operated valve for each axle of the vehicle, and means for controlling the respective valve according to the speed of the slowest wheel on the associated axle.

14. Apparatus as claimed in claim 13, in which the electrically operated valve incorporated in the brake circuit of the rear axle is of the "hit or miss" type.

15. Apparatus as claimed in claim 14 further comprising deceleration threshold means for controlling the electrically operated valve incorporated in the braking circuit of the rear axle.

16. Apparatus as claimed in claim 14 further comprising slip threshold means for controlling the electrically operated valve incorporated in the braking circuit of the rear axle.

* * * * *